US010845842B2

(12) United States Patent
VanBlon et al.

(10) Patent No.: US 10,845,842 B2
(45) Date of Patent: Nov. 24, 2020

(54) SYSTEMS AND METHODS FOR PRESENTATION OF INPUT ELEMENTS BASED ON DIRECTION TO A USER

(71) Applicant: Lenovo (Singapore) Pte. Ltd., Singapore (SG)

(72) Inventors: Russell Speight VanBlon, Raleigh, NC (US); Axel Ramirez Flores, Cary, NC (US); Rodrigo Felix de Almeida, Raleigh, NC (US); Jonathan Jen-Wei Yu, Raleigh, NC (US); Ratan Ray, Cary, NC (US); James A. Hunt, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/370,448

(22) Filed: Mar. 29, 2019

(65) Prior Publication Data
US 2020/0310490 A1    Oct. 1, 2020

(51) Int. Cl.
*G09G 5/00* (2006.01)
*G06F 1/16* (2006.01)
*G06F 3/0481* (2013.01)
*G06K 9/00* (2006.01)

(52) U.S. Cl.
CPC .......... *G06F 1/1622* (2013.01); *G06F 1/1686* (2013.01); *G06F 3/04812* (2013.01); *G06K 9/00355* (2013.01); *G06F 2200/1614* (2013.01)

(58) Field of Classification Search
CPC ............... G06F 1/1622; G06F 3/04812; G06F 2200/1614; G06K 9/00355
See application file for complete search history.

(56) References Cited

U.S. PATENT DOCUMENTS

| | | | |
|---|---|---|---|
| 9,047,698 B2* | 6/2015 | Maciocci | G06F 3/147 |
| 10,444,021 B2* | 10/2019 | Hare | G06F 16/29 |
| 2002/0044152 A1* | 4/2002 | Abbott, III | G06T 11/00 |
| | | | 345/629 |
| 2010/0267424 A1* | 10/2010 | Kim | H04M 1/72519 |
| | | | 455/566 |
| 2011/0216059 A1* | 9/2011 | Espiritu | G06T 19/00 |
| | | | 345/419 |
| 2012/0218191 A1* | 8/2012 | Huang | G06F 1/1643 |
| | | | 345/173 |
| 2012/0249741 A1* | 10/2012 | Maciocci | G06F 3/017 |
| | | | 348/46 |
| 2015/0169049 A1* | 6/2015 | Ko | G06F 3/013 |
| | | | 345/156 |

* cited by examiner

*Primary Examiner* — Joe H Cheng
(74) *Attorney, Agent, or Firm* — John M. Rogitz; John L. Rogitz (57) ABSTRACT

In one aspect, a device includes at least one processor, at least one touch-sensitive display accessible to the at least one processor, and storage accessible to the at least one processor. The storage includes instructions executable by the at least one processor to present at least a first input element in a first orientation on the at least one touch-sensitive display and to receive a signal from at least one sensor indicating a direction to a user in proximity to the at least one touch-sensitive display. The instructions are also executable to, responsive to the signal, present the first input element in a second orientation on the at least one touch-sensitive display.

20 Claims, 7 Drawing Sheets

SYSTEMS AND METHODS FOR PRESENTATION OF INPUT ELEMENTS BASED ON DIRECTION TO A USER

FIELD

The present application relates to technically inventive, non-routine solutions that are necessarily rooted in computer technology and that produce concrete technical improvements.

BACKGROUND

As recognized herein, different users may be sitting on opposite sides of a horizontally-oriented display. Because of this, one user may be able to view content presented on the display right-side-up, while the other user would be relegated to viewing the content upside down. As also recognized herein, this can be particularly frustrating when the other user wishes to select a button presented on the display as part of the content but might have trouble reading and selecting the appropriate button when viewing the content upside down. There are currently no adequate solutions to the foregoing computer-related, technological problem.

SUMMARY

Accordingly, in one aspect a device includes at least one processor, at least one touch-sensitive display accessible to the at least one processor, and storage accessible to the at least one processor. The storage includes instructions executable by the at least one processor to present at least a first input element in a first orientation on the at least one touch-sensitive display and to receive a signal from at least one sensor indicating a direction to a user in proximity to the at least one touch-sensitive display. The instructions are also executable to, responsive to the signal, present the first input element in a second orientation on the at least one touch-sensitive display.

In some embodiments, the device may include the at least one sensor. The at least one sensor may include a proximity sensor and/or a camera, and the at least one sensor may generate the signal responsive to sensing a limb of the user. Also in some embodiments, the first input element may include text, and the second orientation may present the text facing the direction of the user.

Moreover, in some embodiments the instructions may be executable to determine a distance to the user. The instructions may then be executable to not present the first input element in the second orientation responsive to the signal based on the distance not satisfying a threshold, and to present the first input element in the second orientation responsive to the signal based on the distance satisfying the threshold.

Still further, in some embodiments the instructions may be executable to determine a period during which a portion of the user is proximate to the at least one touch-sensitive display. The instructions may then be executable to not present the first input element in the second orientation responsive to the signal based on the period not satisfying a threshold, and to present the first input element in the second orientation responsive to the signal based on the period satisfying the threshold.

Even further, if desired the instructions may be executable to determine a period that the first input element is presented in the second orientation and to automatically present the first input element in the first orientation responsive to the period satisfying a threshold.

Additionally, in some embodiments the instructions may be executable to present the first input element in the second orientation responsive to the user being a first user and responsive to the signal, and to not present the first input element in the second orientation responsive to the user being a second user and responsive to the signal.

In some embodiments, the instructions may also be executable to change the orientation of the first input element from the first orientation to the second orientation at a first speed at a first time, and to change the orientation of the first input element from the first orientation to the second orientation at a second speed at a second time, where the second speed may be different from the first speed. Additionally or alternatively, the instructions may be executable to change the orientation of the first input element by rotating the first input element responsive to the signal and to change an orientation of a second input element by rotating the second input element responsive to the signal. Still further, the instructions may be executable to change the orientation of the first input element by translationally moving the first input element on the at least one touch-sensitive display responsive to the signal, and to change an orientation of a second input element by translationally moving the second input element on the at least one touch-sensitive display responsive to the signal.

In another aspect, a method includes presenting one or more graphical elements on a display in a first orientation and identifying a user as being proximate to the display. The method also includes presenting, based on identifying the user as being proximate to the display, at least a first graphical element of the one or more graphical elements in a second orientation different from the first orientation in which the first graphical element was presented.

In still another aspect, a computer readable storage medium that is not a transitory signal includes instructions executable by at least one processor to present content on a display in a first orientation, identify at least a portion of a person as being proximate to the display based on input from at least one sensor, and rotate the content to a second orientation responsive to identification of at least the portion of the person as being proximate to the display.

The details of present principles, both as to their structure and operation, can best be understood in reference to the accompanying drawings, in which like reference numerals refer to like parts, and in which:

DETAILED DESCRIPTION

The present application discloses systems and methods to change the orientation of presentation of, e.g., a button presented on a display from a first orientation to a second orientation based on where a user's arm is detected as coming from using skeleton recognition, finger direction, hover detection, etc. Once the user's limb is detected, the device may control its display to rotate and/or show rotated buttons oriented for the user that has interacted with the device via his or her arm.

Thus, for example, in the first orientation where the button might face away from the user, the orientation of each letter presented as part of the button, from top to bottom, may point away from a direction defined from the display to the user. In the second orientation where the button might face toward the user, the orientation of each letter presented as part of the button, from top to bottom, may point toward the direction defined from the display to the user. This may occur whether the display is oriented horizontally or at another angle with respect to a desk or table on which the device might be disposed.

The foregoing may be triggered by, for example, a user moving closer to the device, where a camera or proximity sensor on the device may be used to detect the approaching user reaching toward the device. Additionally, a threshold distance may be used to activate content rotation, e.g., 12 inches. Detection of a hand or arm hovering over the device may also be used, where the hand or arm may be detected using the camera or proximity sensor or even using the capacitive sensor elements within the display itself to detect the hover. In some embodiments, a combination of these methods may be used to balance speed of rotation with false positives.

Once rotated, the content presentation may stay in that orientation, or it may return to the previous orientation or another (third) orientation for a known meeting organizer, presenter, etc. Configuration policies may also be specified to only allow specific users/seating locations to cause rotation. Various users may be recognized by leveraging user detection methods such as facial recognition, wireless identifier (e.g., certain users associated with certain respective smart phones communicating via Bluetooth with the device and indicating respective smart phone identification numbers to the device), etc.

Additionally, in some examples the device may rotate content at either a fast or slow setting, or an amount in between. Slower rotation may be helpful in some instances for a user to not accidentally touch the wrong button due to "jumping controls", while faster rotation may be helpful in other instances to cause more quick rotation for the user to have proper orientation for better reading.

In some examples, all of the content presented on the display may be rotated via rotation of the content on a center axis of the display that extends through the display perpendicular to a plane established by the display. In other examples, each individual control or graphical element to which a user is detected as being proximate may be rotated individually so that the control/element is rotated on a center axis of the control/element itself that extends through the control/element perpendicular to a plane established by the display. Furthermore, in some examples the individual control or graphical element as a whole need not be rotated and instead only any text presented on that control or graphical element may be rotated.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
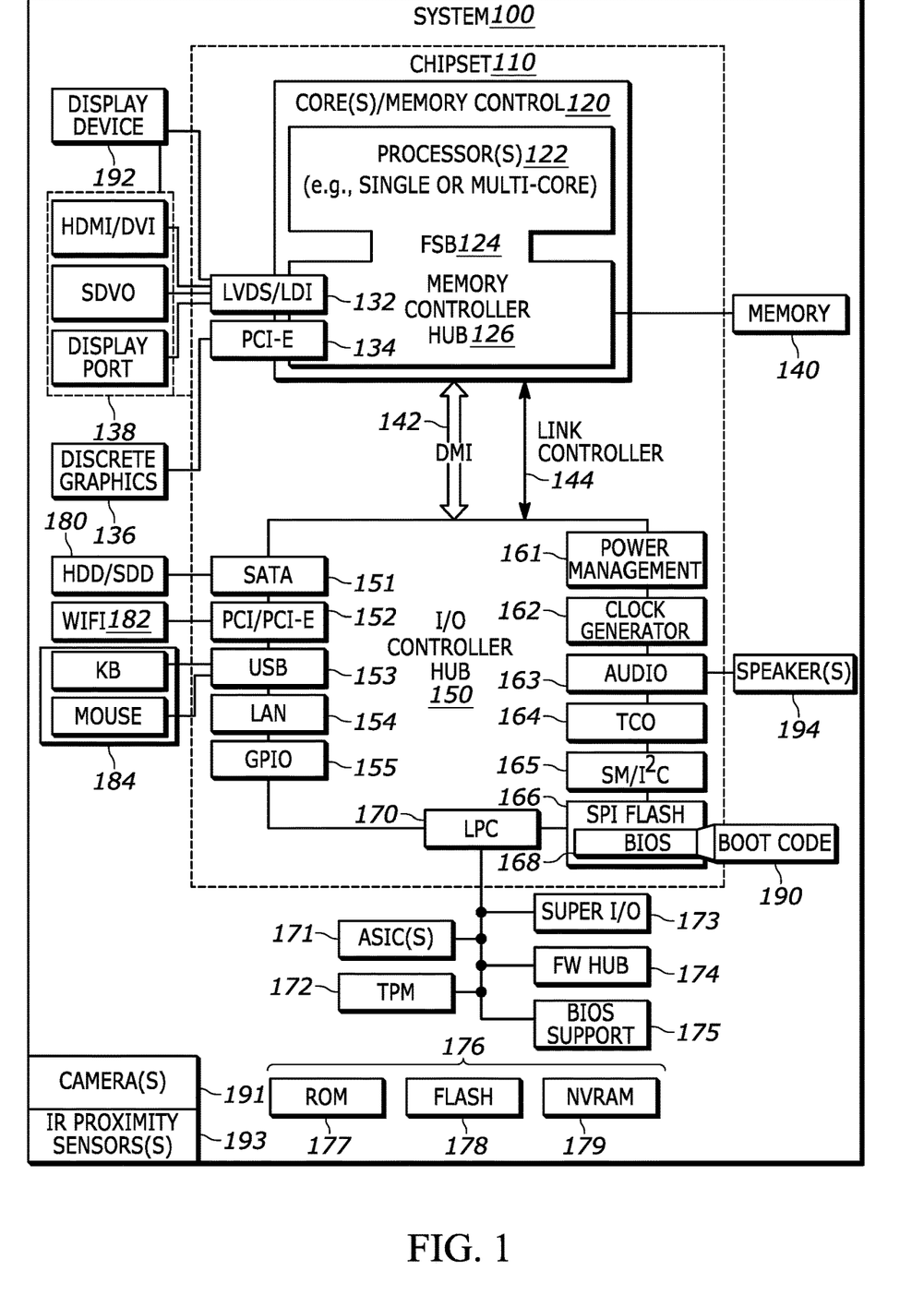
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled/sensitive light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include one or more sensors accessible to the one or more processors 122 so that input from the one or more sensors may be provided to the one or more processors 122 in accordance with present principles. For example, the system 100 may include one or more cameras 191 and one or more infrared (IR) proximity sensors 193. The cameras 191 may be, for example, thermal imaging cameras, infrared (IR) cameras, digital cameras such as webcams, three-dimensional (3D) cameras, and/or cameras otherwise integrated into the system 100 and controllable by the processor 122 to gather pictures/images and/or video.

Additionally, though not shown for simplicity, in some embodiments the system 100 may include other sensors such as one or more microphones. The system 100 may also include, e.g., a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver (another example of a sensor in accordance with present principles) that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
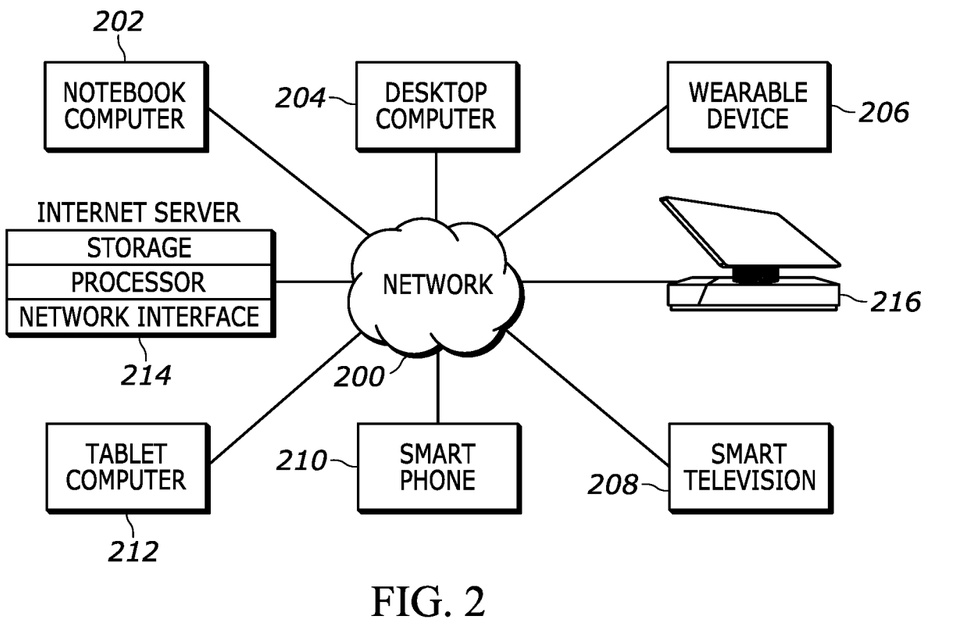
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a conferencing hub device 216, and a server 214 such as an Internet server that may provide cloud storage accessible to the devices 202-212, 216. The server 214 and/or hub device 216 may also execute software instructions to undertake present principles, as may any of the other devices shown in FIG. 2 for that matter. It is to be further understood that the devices 202-216 are configured to communicate with each other over the network 200 to undertake present principles.

Describing the conferencing hub device 216 in more detail, it may be, for example, an IP conference phone, a Lenovo ThinkSmart Hub 500, and/or a Lenovo ThinkSmart Hub 700 that may communicate with the server 214 for things such as object and facial recognition and other tasks in accordance with present principles. Furthermore, the conferencing hub device 216 may include, for example, one or more processors, one or more of the sensors such as infrared proximity sensors and/or cameras to be used at least as described herein, one or more touch-enabled displays for presenting content/input elements and detecting hovers as disclosed herein, one or more storage areas, a keypad for telephone dialing, a microphone for detecting sound, a speaker for providing audio, etc.

Figure 3:
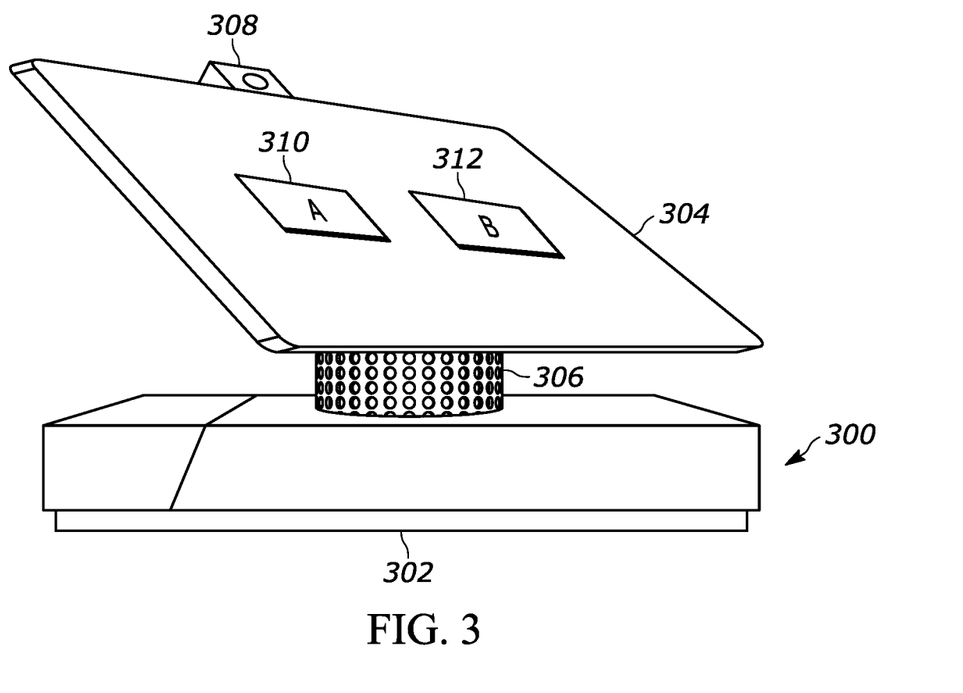
FIG. 3 shows an example hub device with a display presenting content thereon in accordance with present principles.

Now in reference to FIG. 3, it shows another example hub device 300 that may be similar to the hub device 216 described above. The hub device 300 may include a hub base 302 in which one or more system components may be housed, such as one or more processors, RAM, one or more storage areas, a microphone for detecting sound, etc. The base 302 may be connected to a touch-sensitive display 304 via cylinder 306, with the cylinder 306 itself including, e.g., a speaker for providing audio. Coupled to the display 304 may be one or more sensors 308 such as one or more infrared (IR) proximity sensors and/or one or more cameras, though the sensors 308 may be located elsewhere on the device 300 as well. Additionally, note that first and second input elements 310, 312 are shown as being presented on the display 304, with the input elements 310, 312 being selectors that are selectable via touch input to provide input to the device 300. For example, the input elements 310, 312 may be square-shaped buttons that may be selectable to provide respective commands to the device 300 to perform different functions.

The display 304 itself may be rotatably coupled to the cylinder 306 for rotation in three dimensions so that, for example, it may be oriented at an oblique angle relative to the base 302 and any surface on which the base 302 may be placed as shown in FIG. 3. Additional orientations in which the display 304 may be rotated with respect to the base 302 include the display 304 being rotated such that its front surface is perpendicular to the top surface of the base 302 and the display 304 being rotated such that its front surface establishes a plane parallel to the top surface of the base 302.

Figure 4:
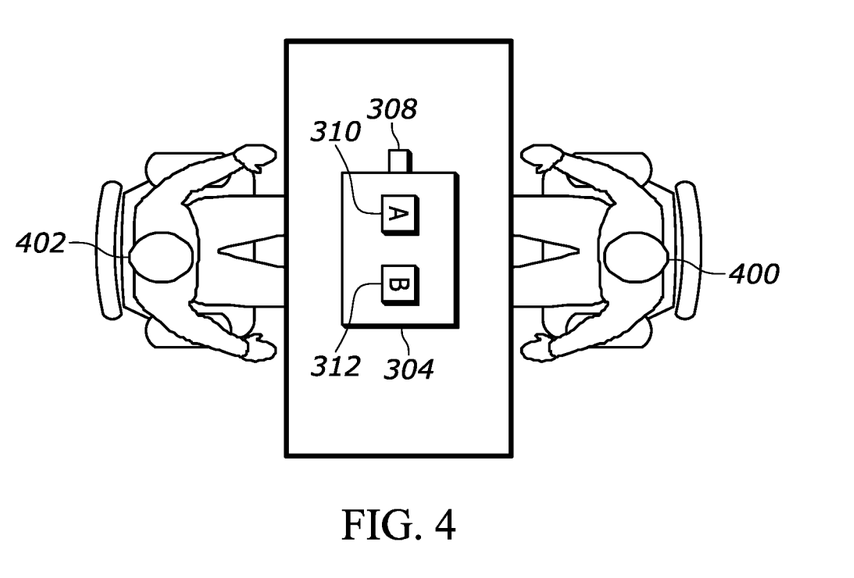
FIGS. 4, 5, and 7 are example illustrations showing how a user might interact with a display in accordance with present principles.
Figure 5:
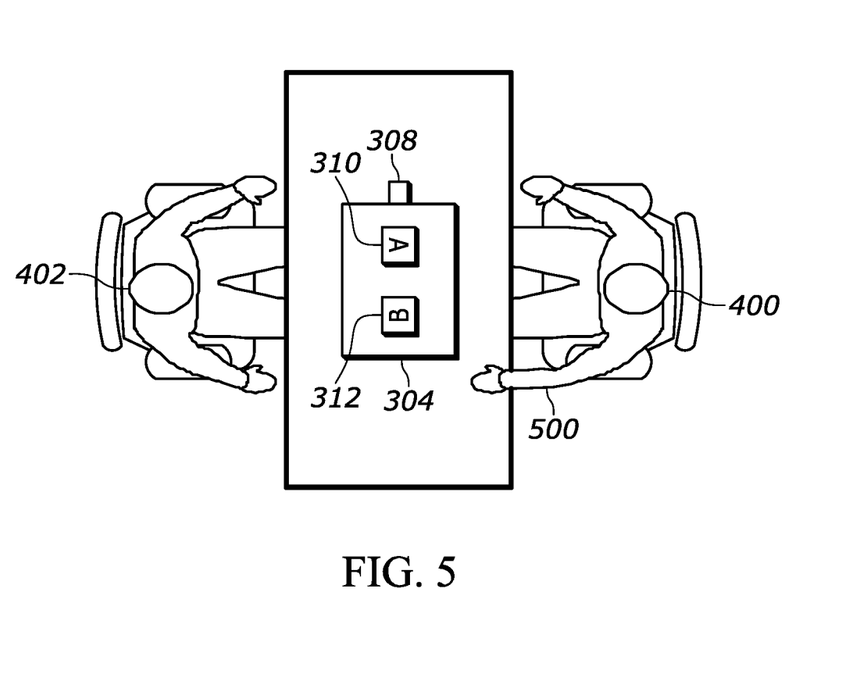

FIGS. 4 and 5 show an example of the front surface of the display 304 being oriented in a plane above and parallel to a top surface of the base 302 while the device 300 sits on a table, with it being understood that these figures show a top plan view of the device 300 as well as users 400, 402.

As depicted in FIG. 4, both input elements 310, 312 are presented in a first orientation in which the orientation of each text letter presented as part of the respective input elements 310, 312, from top to bottom, points toward the user 402 and away from a direction defined from the display 304 to the user 400.

As depicted in FIG. 5, once a limb 500 of the user 400 (e.g., a portion of the user's hand or arm) is detected by the device 300 as being proximate to the input element 312 via input from the sensor(s) 308 on the device 300, presentation of the input element 312 may change to a second orientation in which the orientation of the letter indicated on the input element 312 (letter "B" in this example), from top to bottom, points toward the direction defined from the display 304 to the user 400. This may make it easier for the user 400 to view the input element 312 right-side up, decipher its content, and possibly decide whether to actually select the input element 312.

Note that in some embodiments, only the text on the input element 312 may be rotated to the second orientation responsive to detection of the limb 500 while other content presented as part of the input element 312 (e.g., an underlying image) may continue to be presented in the first orientation as depicted in FIG. 4. But in other embodiments, the entire input element 312 may be rotated about its center axis to the second orientation responsive to detection of the limb 500. In either case, while some or all of the content of the input element 312 may be rotated in the second orientation, orientation of the input element 310 may remain the same as was depicted in FIG. 4 (as also depicted in FIG. 5).

However, note that in still other embodiments, the entirety of the content presented on the display 304 (including the elements 310, 312 and any other images or text that might be concurrently presented) may be rotated to the second orientation responsive to detection of the limb 500 as being proximate to element 312.

Figure 6:
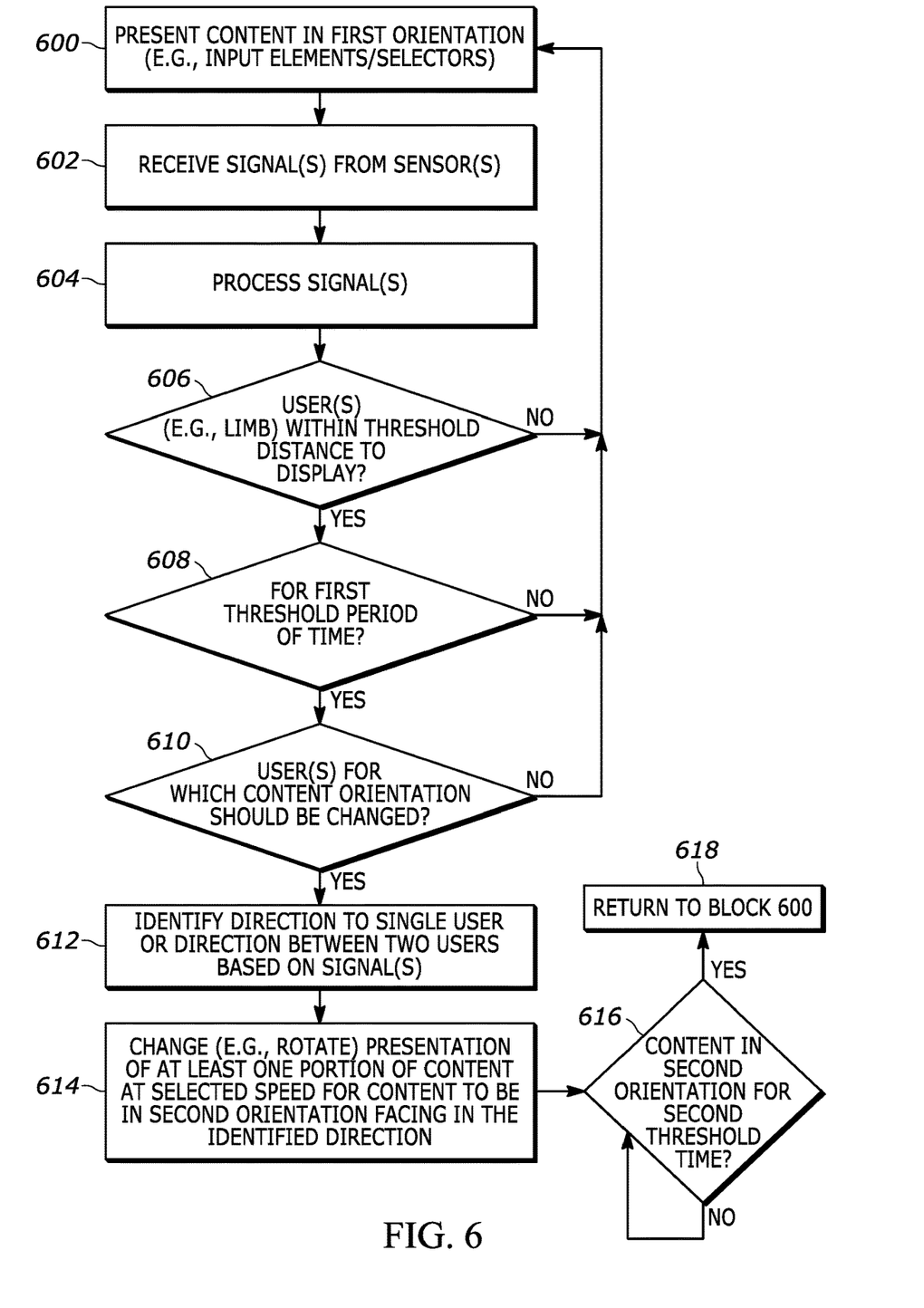
FIG. 6 is a flow chart of an example algorithm in accordance with present principles.

Continuing the detailed description in reference to FIG. 6, it shows example logic that may be executed by a device such as the system 100, the server 214, and/or a hub device in accordance with present principles. Beginning at block 600, the device may present content on a display in a first orientation. The logic may then move to block 602 where the device may receive one or more signals from one or more sensors disposed on or otherwise in communication with the device. For example, the sensors may include IR proximity sensors and/or a camera located on the device itself as depicted in FIGS. 3-5, and/or one or more of the sensors may be disposed elsewhere while in wireless communication with the device (e.g., elsewhere within a room in which the device is disposed, such as mounted on a wall).

After block 602 the logic may flow to block 604, where the device may process the signals. For example, the device may use proximity sensor software to process the signal(s) received at block 602 if received from an IR proximity sensor to determine a user's limb as being proximate to the display and even determine a direction from the display to the limb. Additionally or alternatively, the device may use facial recognition software and/or object recognition software to process the signal(s) received at block 604 if received from a camera to identify the user's limb as being proximate to the display and to even determine not just the direction from the display to the limb but also the identity of the user should one of the images from the camera show the user's face.

Based on the processing of the signal(s) performed at block 604, the device may then proceed to decision diamond 606 where the device may determine if in fact a portion of the user is within a threshold non-zero distance to the display. A negative determination may cause the logic to revert back to block 600 and proceed therefrom, while an affirmative determination may instead cause the logic to proceed to decision diamond 608. Then at decision diamond 608 the device may determine whether the portion of the user has been within the threshold non-zero distance for a continuous threshold non-zero period of time. A negative determination may cause the logic to revert back to block 600 and proceed therefrom, while an affirmative determination may instead cause the logic to proceed to decision diamond 610.

At decision diamond 610 the device may determine whether the user as might have been identified using facial recognition as described above is in fact a user for which the presented content's orientations should be changed. For example, if three people are meeting in a meeting room and interacting with the device, only the person that organized the meeting may establish a user for which the presented content's orientations should be changed. As another example, if three people are meeting in a meeting room and interacting with the device, only two users that have been registered as users authorized to control the device may respectively establish a user for which the presented content's orientations should be changed. A negative determination at diamond 610 may cause the logic to revert back to block 600 and proceed therefrom, while an affirmative determination may instead cause the logic to proceed to block 612.

At block 612 the device may, based on the steps executed at blocks 602 and 604, identify a direction to the user detected as proximate to the display. In some embodiments at block 612, the device may actually determine a direction between two users. This might occur in embodiments where, for example, an input element presented as part of the content at block 600 is to be rotated for two different users to both be able to see the input element upright. This feature will be discussed further below in reference to FIG. 7.

Sill in reference to FIG. 6, however, from block 612 the logic may then proceed to block 614 where the device may change the presentation of at least a portion of the content to a second orientation facing in the direction identified at block 612. For example, block 614 may be executed to result in presentation of input element 312 as shown in FIG. 5, where the orientation of one or more letters presented as part of the input element 312, from top to bottom, point toward the direction identified at block 612.

The orientation of the portion of content itself may be changed by rotating, translationally moving, and/or revolving at least the portion. Additionally, in some embodiments based on user-configuration of a setting selecting a certain rotation speed, the content may be rotated at block 614 using the selected speed, e.g., fast or slow. This feature will be discussed further below in reference to FIG. 8.

Still in reference to FIG. 6, from block 614 the logic may proceed to decision diamond 616. At diamond 616 the device may determine whether the content changed at block 614 has been in the second orientation for at least a second threshold non-zero amount of time, which may be the same amount of time or a different amount of time as the first threshold amount of time (e.g., two seconds for the first threshold, and five seconds for the second threshold). The device may do so at diamond 616 by tracking time using a timer or clock application executing at the device. A negative determination may cause the logic to continue making the determination at diamond 616 until an affirmative determination is made and/or until the user/limb is removed from the proximity to the display. Once an affirmative determination has been made at diamond 616, the logic may proceed to block 618 where the device may return to step 600 and proceed therefrom.

Note that while FIG. 6 illustrates the logic in flow chart format, state logic or other equivalent logic may also be used.

Figure 7:
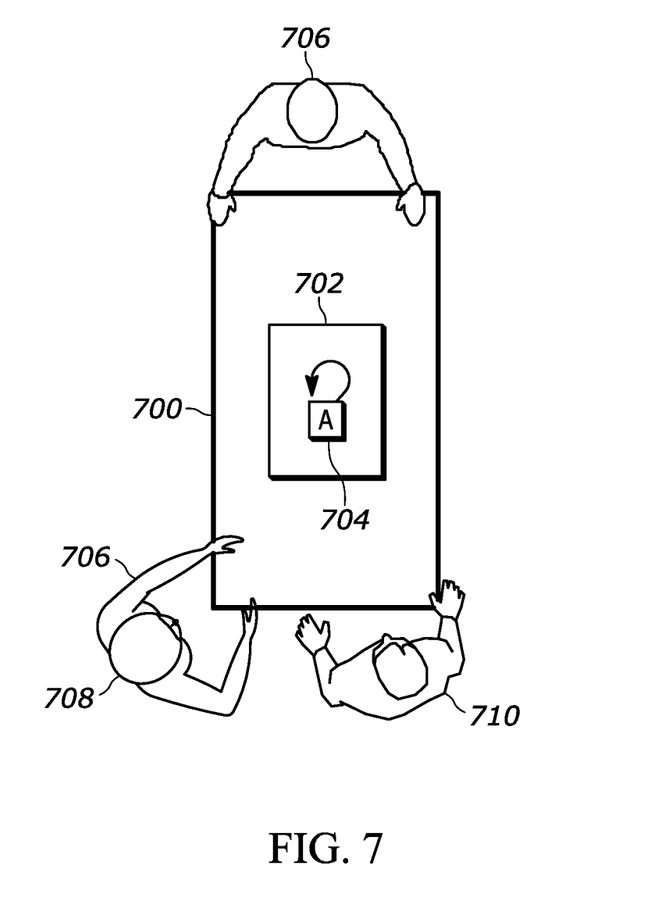

Describing the top plan view illustration of FIG. 7, suppose that three users have gathered around a conference table 700 that has a hub device with a display 702 disposed thereon, with the front of the display 702 oriented in a plane parallel to the top of the table 700. Also suppose that the selector 704 was previously presented in a first orientation in which it was facing a direction from a top of the letter "A" to the bottom of the letter "A" toward user 706. Responsive to the device detecting an arm 706 of user 708 as coming within a threshold distance of one foot to the display 702, the device may rotate the selector 704 and the associated text (the letter "A") to be oriented in a direction half way between a direction to user 708 from the display and a direction to user 710 from the display, with the direction to both users 708, 710 also being detected by the device. The device may do so in order for both of the users 708 and 710 to appreciate the text presented on the selector 704, as well as for the user 710 to appreciate an action being taken by the user 708 to select the selector 704 to provide a command to the device (e.g., a command to send an email, a command to enter text into a word processing document, a command to launch an application, etc.).

Furthermore, in some embodiments the device may change the selector 704 to the second orientation only if, for example, the user 710 is detected as being no more than a threshold non-zero distance from the user 708 as might be determined using images from a camera on the device and execution of spatial analysis software. Additionally, or alternatively, the device may change the selector 704 to the second orientation only if, for example, the user 710 is detected as being no more than a threshold non-zero angle away from user 708 with respect to the display 702 itself (e.g., forty-five degrees).

Figure 8:
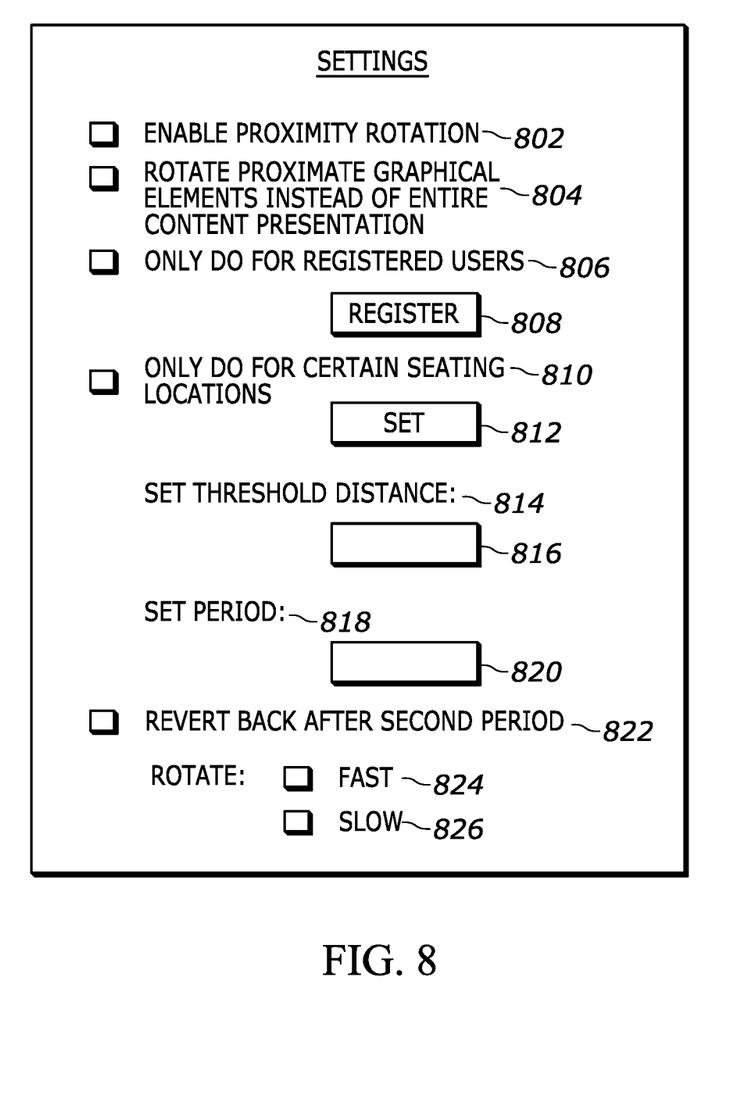
FIG. 8 is an example graphical user interface (GUI) for configuring settings of a device undertaking present principles.

Continuing the detailed description in reference to FIG. 8, it shows an example graphical user interface (GUI) 800 for configuring one or more settings of a device undertaking present principles, whether that be a hub device or a server assisting in processing for the hub device (e.g., remotely-executing facial recognition using images collected by a camera on the hub device and then providing a user ID back to the hub device for further processing). The settings to be discussed below may be respectively selectable based on selection of the respective check box adjacent to the setting.

As shown in FIG. 8, the GUI 800 may include a first setting 802 that is selectable to configure or enable the device to perform content rotations based on detections of user proximity to a display. For example, the setting 802 may be enabled to set the device to undertake the logic set forth above with respect to FIG. 6.

The GUI 800 may also include a second setting 804 that is selectable to configure or enable the device to rotate only portions of presented content that are proximate to an identified user instead of rotating the entirety of the content presented on the display upon detection of user proximity to the display. For example, the second setting 804 may be selected to enable the device to rotate individual graphical elements based on a user being detected in proximity to one or the other of the elements, while not rotating other elements for which the user is not determined to be proximate.

Setting 806 may also be presented as part of the GUI 800, with the setting 806 being selectable to enable content rotation in accordance with present principles only for certain registered users rather than any person that might be detected as proximate to the display. Thus, setting 806 may be accompanied on the GUI 800 by a selector 808, which may be selectable for a user to proceed through a process for registering one or more users for which content should be rotated.

The GUI 800 may also include a setting 810 that is selectable to enable content rotation in accordance with present principles only for users disposed at certain pre-defined seating locations. For example, there may be instances where only users seated at opposing heads of a table may be used for content rotation based on detection of proximity of one of their limbs, whereas users at other seating locations may not be considered by the device for content rotation. Thus, setting 810 may be accompanied by selector 812, which may be selectable for a user to proceed through a process for defining one or more seating locations for which content should be rotated.

An option 814 may also be presented on the GUI 800 for a user to define a threshold non-zero distance to a display within which content should be rotated in accordance with present principles. Thus, a user may direct input to input box 816 to establish the threshold distance for user proximity. For example, a user may direct input to input box 816 to establish the threshold distance used at diamond 606 described above.

An option 818 may also be presented on the GUI 800 for a user to define a threshold non-zero period of time for which a user is to be detected as within a proximity to a display to cause content rotation. Thus, a user may direct input to input box 820 to establish the threshold period for user proximity. For example, a user may direct input to input box 820 to establish the threshold period used at diamond 608 described above.

The GUI 800 may also include a setting 822 that is selectable to enable or configure the device to revert back to a previous orientation after another threshold non-zero period of time. For example, a user may select setting 822 to enable or configure the device to revert to a previous content orientation as described above with respect to diamond 616.

Still further, the GUI 800 may include a setting 824 to select a fast speed of rotation for altering content presentation as discussed herein. The GUI 800 may also include a setting 826 that may be selected instead to select a slower speed of rotation for altering content presentation as discussed herein.

It may now be appreciated based on the foregoing detailed description that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   at least one touch-sensitive display accessible to the at least one processor; and
   storage accessible to the at least one processor and comprising instructions executable by the at least one processor to:
   present, on the at least one touch-sensitive display, at least a first input element in a first orientation;

receive, from at least one sensor, a signal indicating a direction to a user in proximity to the at least one touch-sensitive display;

determine a period during which a portion of the user is proximate to the at least one touch-sensitive display;

responsive to the period not satisfying a threshold, not present the first input element in a second orientation on the at least one touch-sensitive display responsive to the signal; and responsive to the period satisfying the threshold, present the first input element in the second orientation responsive to the signal.

2. The device of claim 1, wherein the first input element comprises text, and wherein the second orientation presents the text facing the direction of the user.

3. The device of claim 1, wherein the sensor generates the signal responsive to sensing a limb of the user.

4. The device of claim 1, wherein the sensor comprises a camera.

5. The device of claim 1, wherein the sensor comprises a proximity sensor.

6. The device of claim 1, wherein the threshold is a first threshold, and wherein instructions are executable by the at least one processor to:

determine a distance to the user;

responsive to the distance not satisfying a second threshold, not present the first input element in the second orientation responsive to the signal; and responsive to the distance satisfying the second threshold, present the first input element in the second orientation responsive to the signal.

7. The device of claim 1, wherein the period is a first period, wherein the threshold is a first threshold, and wherein instructions are executable by the at least one processor to:

determine a second period that the first input element is presented in the second orientation; and responsive to the second period satisfying a second threshold, automatically present the first input element in the first orientation.

8. The device of claim 1, wherein instructions are executable by the at least one processor to:

responsive to the user being a first user and responsive to the signal, present the first input element in the second orientation on the at least one touch-sensitive display; and responsive to the user being a second user and responsive to the signal, not present the first input element in the second orientation on the at least one touch-sensitive display.

9. The device of claim 1, wherein instructions are executable by the at least one processor to:

change the orientation of the first input element from the first orientation to the second orientation at a first speed at a first time; and change the orientation of the first input element from the first orientation to the second orientation at a second speed at a second time, the second speed being different from the first speed.

10. The device of claim 1, wherein instructions are executable by the at least one processor to:

change the orientation of the first input element by rotating the first input element responsive to the signal.

11. The device of claim 10, wherein instructions are executable by the at least one processor to:

change an orientation of a second input element by rotating the second input element responsive to the signal.

12. The device of claim 1, wherein instructions are executable by the at least one processor to:

change the orientation of the first input element by translationally moving the first input element on the at least one touch-sensitive display responsive to the signal.

13. The device of claim 12, wherein instructions are executable by the at least one processor to:

change an orientation of a second input element by translationally moving the second input element on the at least one touch-sensitive display responsive to the signal.

14. The device of claim 1, comprising the sensor.

15. A method, comprising:

presenting, on a display, one or more graphical elements in a first orientation;

identifying a user as being proximate to the display; and presenting, based on identifying the user as being proximate to the display, at least a first graphical element of the one or more graphical elements in a second orientation different from the first orientation in which the first graphical element was presented;

wherein proximate to the display is within a threshold non-zero distance to the display.

16. The method of claim 15, wherein the one or more graphical elements each respectively comprise a selector that is selectable to provide input to a device in communication with the display.

17. The method of claim 16, wherein the one or more graphical elements comprise the first graphical element and a second graphical element different from the first graphical element, and wherein the method comprises:

presenting, based on the identifying the user as being proximate to the display, the first graphical element in the second orientation while maintaining the second graphical element in the first orientation.

18. The method of claim 15, comprising:

identifying two users as being proximate to the display; and presenting, based on identifying the two users as being proximate to the display, at least the first graphical element in the second orientation, the second orientation presenting the first graphical element facing a direction between the two users.

19. A computer readable storage medium (CRSM) that is not a transitory signal or a propagating electrical signal or an electromagnetic signal per se or a carrier wave the computer readable storage medium comprising instructions executable by at least one processor to:

present content on a display in a first orientation;

identify, based on input from at least one sensor, at least a portion of a person as being proximate to the display; and rotate the content to a second orientation responsive to identification of at least the portion of the person as being proximate to the display;

wherein the content comprises a selector that is selectable to provide input to a device in communication with the display.

20. The CRSM of claim 19, wherein proximate to the display is within a threshold non-zero distance to the display.

* * * * *